(12) United States Patent
Madan et al.

(10) Patent No.: US 6,581,035 B1
(45) Date of Patent: Jun. 17, 2003

(54) SYSTEM AND METHOD FOR VOICE-ENABLED TRANSACTIONS

(75) Inventors: Bharat B. Madan, Cary, NC (US); Mona Singh, Cary, NC (US)

(73) Assignee: Ericsson Inc., Research Triangle Park, NC (US)

( * ) Notice: Subject to any disclaimer, the term of this patent is extended or adjusted under 35 U.S.C. 154(b) by 369 days.

(21) Appl. No.: 09/614,085

(22) Filed: Jul. 11, 2000

(51) Int. Cl.[7] .............................................. G10L 21/00
(52) U.S. Cl. ................. 704/273; 379/88.17; 379/93.12; 705/64
(58) Field of Search ................................ 704/255, 256, 704/270, 273, 275; 379/88.01, 88.17, 88.23, 88.14, 67.1, 93.12; 705/1, 26, 27, 37, 75, 77, 65, 64; 235/379

(56) References Cited

U.S. PATENT DOCUMENTS

| | | | | |
|---|---|---|---|---|
| 5,255,305 A | * | 10/1993 | Sattar | 379/34 |
| 5,452,341 A | * | 9/1995 | Sattar | 379/88 |
| 5,453,601 A | * | 9/1995 | Rosen | 235/379 |
| 5,633,916 A | * | 5/1997 | Goldhagen et al. | 379/67 |
| 6,122,625 A | * | 9/2000 | Rosen | 705/65 |
| 6,195,417 B1 | * | 2/2001 | Dans | 379/67.1 |
| 6,236,972 B1 | * | 5/2001 | Shkedy | 705/1 |
| 6,260,024 B1 | * | 7/2001 | Shkedy | 705/37 |
| 6,263,051 B1 | * | 7/2001 | Saylor et al. | 379/88.17 |
| 6,341,264 B1 | * | 1/2002 | Kuhn et al. | 704/255 |
| 6,349,290 B1 | * | 2/2002 | Horowitz et al. | 705/35 |
| 6,373,939 B1 | * | 4/2002 | Reese et al. | 379/266.1 |
| 6,377,927 B1 | * | 4/2002 | Loghmani et al. | 704/275 |

\* cited by examiner

*Primary Examiner*—Susan McFadden
(74) *Attorney, Agent, or Firm*—Wood, Phillips, VanSanten, Clark & Mortimer (57) ABSTRACT

A server for processing voice-enabled transactions from a communication device including a communications interface in communication with the communications device for receiving a voice transaction message generated at the communications device, the voice transaction message being in one of a plurality of predetermined formats for carrying out a transaction. A voice recognition processor is coupled to the communications interface for performing voice recognition on the voice transaction message to generate a recognized message. A controller, operating under a program and in communication with the communications interface and the voice recognition processor, receives the recognized message, generates a corresponding processed transaction message for the transaction, and sends the processed transaction message to the communications device using the communications interface. The controller further receives a verification message from the communications device via the communications interface indicating one of processed transaction message correct and processed transaction message not correct, and carries out the transaction where the verification message indicates that the processed transaction message is correct.

25 Claims, 3 Drawing Sheets

| 300 ↓ | 302 ↓ | 304 ↓ |
|---|---|---|
| BUY | item variable field 306 | Ericy |
| QUANTITY | number variable field 308 | 100 |
| FROM | name variable field 310 | Stock Broker X |
| TIME | time variable field 312 | day |
| EXECUTION | execution variable field 314 | at limit 40 |

Fig 3

| 400 ↓ | 402 ↓ | 404 ↓ |
|---|---|---|
| TRANSFER | number variable field 406 | 150 |
| FROM | source account variable field 408 | Checking |
| TO | destination account variable field 410 | Savings |
| AT | bank variable field 412 | 1st Bank OF X |

Fig 4

| 500 ↓ | 502 ↓ | 504 ↓ |
|---|---|---|
| GET STOCK QUOTE | symbol variable field 506 | Ericy |

Fig 5

| 600 ↓ | 602 ↓ | 604 ↓ |
|---|---|---|
| NOTIFY | event variable field 606 | Dow Jones Drops |
| CONDITION | qualification variable field 608 | 1% points |
| TIME | time variable field 610 | day |

Fig 6 ns device.

SYSTEM AND METHOD FOR VOICE-ENABLED TRANSACTIONS

BACKGROUND OF THE INVENTION

The present invention relates to voice-enabled transactions from a communications device.

Increases in technology allow communications devices, for example cellular telephones, to provide more than just wireless voice telephone service to a user. Cellular telephone users are able to use their cellular telephone to access the Internet, receive and send e-mail, perform transactions such as purchase stock or other items, etc. However, the Man-Machine Interface (MMI) provided by a cellular phone is rather rudimentary. This is due to limited size of the keypad and the display and makes it difficult to enter and view information (e.g., transaction information to purchase stock or other items) at the cellular telephone.

Some cellular telephones attempt to solve this problem by providing a speech, or voice MMI, where the information is recognized by the cellular telephone and then transmitted. However, such voice interfaces provide the user with the ability to perform only a small number of transactions.

SUMMARY OF THE INVENTION

In one aspect of the present invention, a method for performing voice-enabled transactions using a communications device includes receiving a voice transaction message at a server from the communications device, the voice transaction message being in one of a plurality of predetermined formats for carrying out a transaction. The voice transaction message is processed and the corresponding processed transaction message is generated for the transaction at the server. The processed transaction message is sent to the communications device, where correctness of the transaction message is verified. A verification message is sent to the server indicating one of processed transaction message correct and processed transaction message not correct. The verification message is processed at the server and the transaction is carried out where the verification message indicates that the transaction is correct.

In one form, a transaction complete message is sent from the server to the communications device after the transaction is carried out.

In another form, receiving the voice transaction message at the server from the communications device includes establishing a connection with the server using the communications device and utilizing the connection to generate the voice transaction message at the server. In a further form, utilizing the connection to generate the voice transaction message at the server includes generating the voice transaction message as a voice mail message at the server.

In yet another form, the plurality of predetermined formats each include at least one static component and at least one variable field for describing the transaction, and processing the voice transaction message and generating the corresponding processed transaction message for the transaction at the server includes performing voice recognition on the voice transaction message to generate a recognized message, and processing the recognized message to identify a first static component. The predetermined format which includes the identified first static component is selected, and the recognized message is processed using the selected predetermined format to determine a value of the at least one variable field. The corresponding processed transaction message is generated using the selected predetermined format and the determined value of the at least one variable field. In a further form, the predetermined format further comprises a second static component and the processing of the recognized message to identify the first static component further includes identifying the second static component, where the predetermined format including the first and second static components is selected. The recognized message is processed using the selected predetermined format to determine the value of the at least one variable field by determining a first location of the first static component of the recognized message, determining a second location of the second static component of the recognized message, and selecting information between the first and the second location of the recognized message as the value of the at least one variable field. In an alternate further form, where each of the plurality of predetermined formats include at least one static component and at least one variable field, the voice transaction message is processed by selecting one of the predetermined formats using the at least one static component and determining a value for the at least one variable field of the preselected format, and the processed transaction message is sent to the communications device by communicating the selected predetermined format and the determined value of the at least one variable field to the communications device. In a further form yet, verifying the correctness of the processed transaction message at the communications device includes displaying the determined value of the at least one variable field and the at least one static field included with the selected predetermined format.

In another form of this aspect of the invention, verifying the correctness of the processed transaction message at the communications device includes a voice verification of the processed transaction message at the communications device.

In another form, where the communications device is a cellular telephone, sending the processed transaction message to the communications device includes converting the processed transaction message to a Short Message Service (SMS) format, and utilizing a server's Short Message Service to send the converted processed transaction message back to the cellular telephone.

In yet another form, carrying out the transaction where the verification message indicates that the transaction is correct includes transmitting information corresponding to the transaction from the server to a transaction service, and performing the transaction at the transaction service. In a further form, transmitting the information corresponding to the transaction from the server to the transaction service is done on the Internet.

In yet another form, the transaction is an e-commerce transaction.

In another form, the communications device is a wireless communications device. In a further form, the wireless communications device is a cellular telephone.

In another aspect of the invention, a server is provided for processing voice-enabled transactions from a communication device including a communications interface in communication with the communications device for receiving a voice transaction message generated at the communications device, the voice transaction message being in one of a plurality of predetermined formats for carrying out a transaction. A voice recognition processor is coupled to the communications interface for performing voice recognition on the voice transaction message to generate a recognized message. A controller operating under a program and in communication with the communications interface and the voice recognition processor, receives the recognized message, generates a corresponding processed transaction message for the transaction, and sends the processed transaction message to the communications device using the communications interface. The controller further receives a verification message from the communications device via the communications interface indicating one of processed transaction message correct and processed transaction message not correct, and carries out the transaction where the verification message indicates that the processed transaction message is correct.

In one form, the controller generates a transaction complete message indicating completion of the transaction, and sends the transaction complete message to the communications device via the communication interface.

In another form, the server further includes a memory coupled to the communications interface, the voice recognition processor, and the controller for storing the voice transaction message, the recognized message, and the plurality of predetermined formats. In a further form, where the plurality of predetermined formats include at least one static component and the at least one variable field for describing the transaction, the controller processes the recognized message by retrieving the recognized message from the memory, identifying a first static component of the recognized message, and selecting the predetermined format which includes the first static component, and processes the recognized message using the selected predetermined format to determine a value of the at least one variable field. The controller generates the corresponding processed transaction message for the transaction using the selected predetermined format and the determined value of the at least one variable field.

In another form, where the communications device is a cellular telephone, the server further includes a short message server processor in communication with the controller and the communications interface where the controller converts the processed transaction message to a short message servie format and sends the processed transaction message to the cellular telephone using the short message service processor and the communications interface.

In yet another form of this aspect, the server further includes a transaction interface in communication with the controller, where the controller establishes a connection with a transaction service using the transaction interface, and carries out the transaction by transmitting information corresponding to the transaction to the transaction service. In a further form, the transaction interface is a connection with the Internet and the transaction service is an Internet website.

In another form, the transaction is an e-commerce transaction.

In yet another form, the voice transaction message includes at least one static component and at least one variable field.

DETAILED DESCRIPTION OF THE INVENTION

Figure 1:
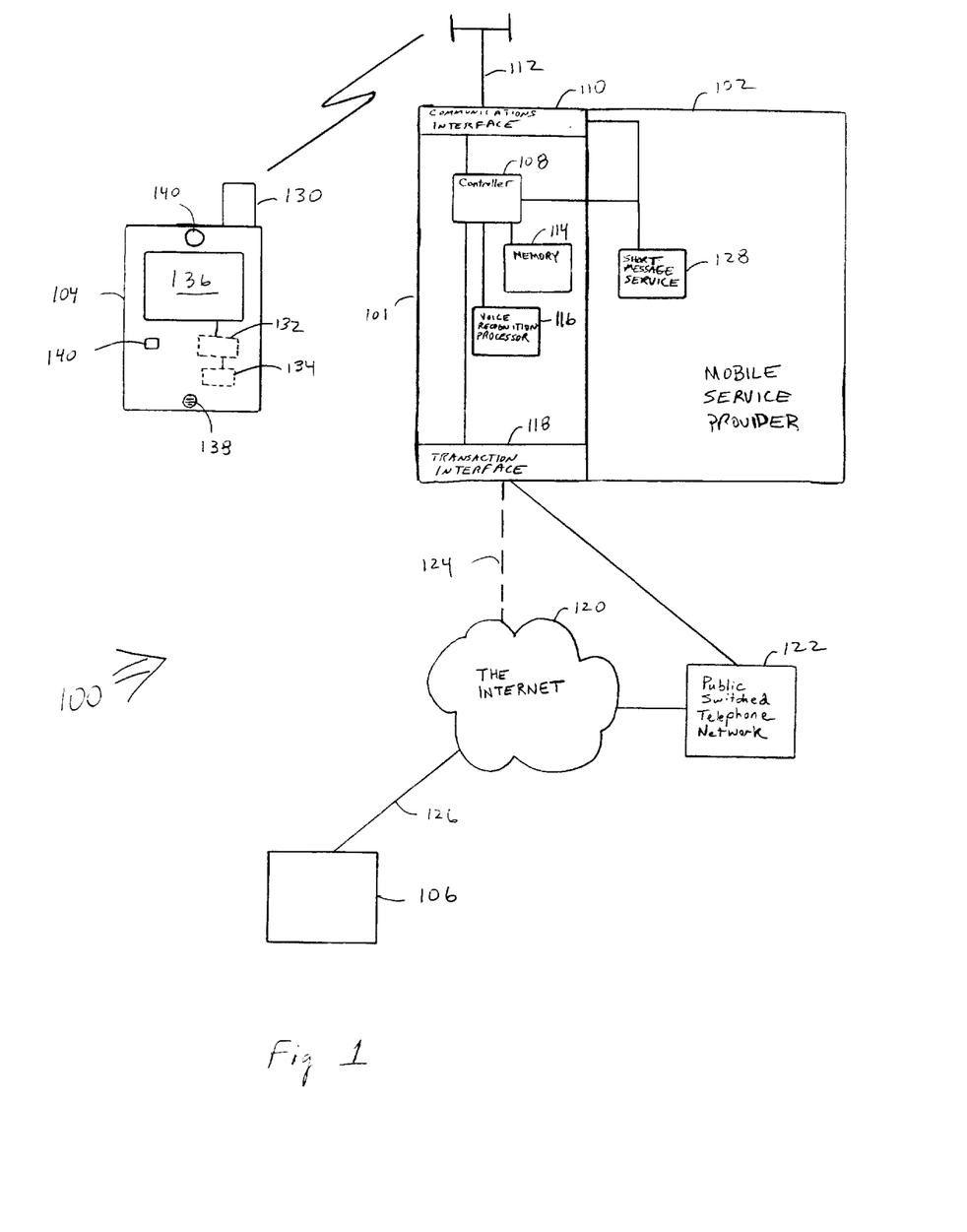
FIG. 1 is a block diagram of a telecommunications system including a server in accordance with an embodiment of the present invention.

FIG. 1 is a block diagram of a telecommunications system 100 in accordance with an embodiment of the present invention. A transaction server 101 of a mobile service provider 102 provides a link for voice transactions between a communications device, for example a mobile terminal such as a cellular telephone 104, and a transaction provider 106.

The transaction server 101 includes a transaction controller 108 for controlling operation of the transaction server 101. The transaction controller 108 is connected to a communications interface 110 which, in combination with a mobile service provider antenna 112 of the mobile service provider 102, sends information to and receives information from the cellular telephone 104. The transaction controller 108 is further connected to a memory 114 for storing information at the transaction server 101, a voice recognition processor 116 for performing voice recognition on voice messages received at the transaction server 101, and a transaction interface 118 which provides a link to the Internet 120 via a public switched telephone network (PSTN) 122, or alternatively via a dedicated data link, for example a T1 data link 124. The Internet 120 is connected to the transaction provider 106 via a second data link 126, where the transaction provider 106 is an Internet website on the Internet 120. The controller 108 is further connected to a short message service (SMS) 128 of the mobile service provider 102, which handles SMS operation for the mobile service provider. The SMS 128 is connected to the communications interface 110.

The cellular telephone 104 includes a cell phone antenna 130 for sending information to and receiving information from the mobile service provider 102. The cell phone antenna 130 is connected to a cell phone controller 132 for controlling operation of the cellular telephone 104. The cell phone controller 132 is connected to a cell phone memory 134 for storing information at the cell phone, a cell phone display 136 for displaying information to a user of the cellular telephone 104, a microphone 138 for providing audio input to the cellular telephone, and a speaker 140 for providing audio output from the cellular telephone 104. Operation of the communications system 100 of FIG. 1 will be discussed with respect to FIGS. 2–6.

Figure 2:
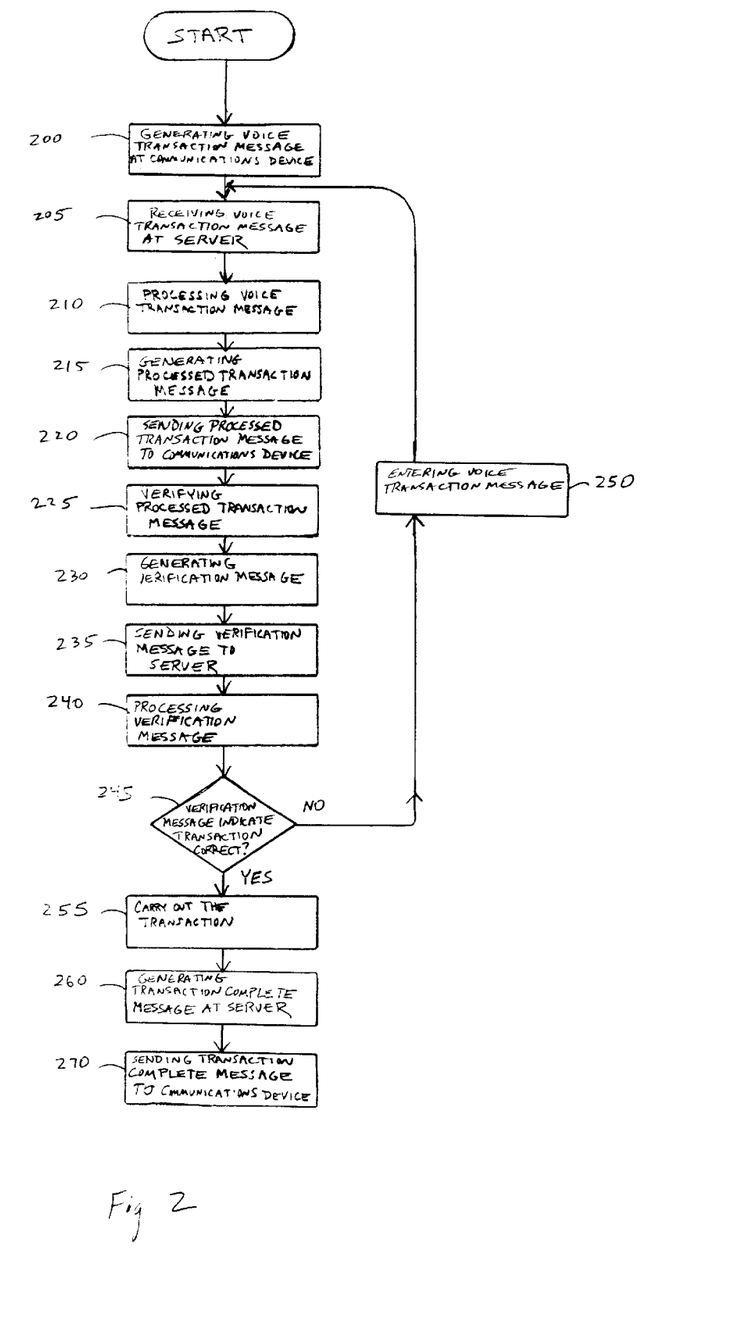
FIG. 2 is a flowchart illustrating operation of an embodiment of the present invention.

FIG. 2 is a flow chart illustrating operation of an embodiment of the present invention. In step 200, the user of the cellular telephone 104 generates a voice transaction message representing a transaction desired to be carried out by the user, where the voice transaction message is one of a plurality of predetermined formats. Before continuing, a further discussion of the predetermined formats will be useful in understanding the present invention.

FIGS. 3–6 illustrate examples of tabular representations of voice transaction message predetermined formats in accordance with various embodiments of the present invention. The voice transaction message comprises at least one static component and at least one variable field for describing the transaction. The at least one static component does not change for a given predetermined format, where the at least one variable field may change from message to message.

Figure 3:
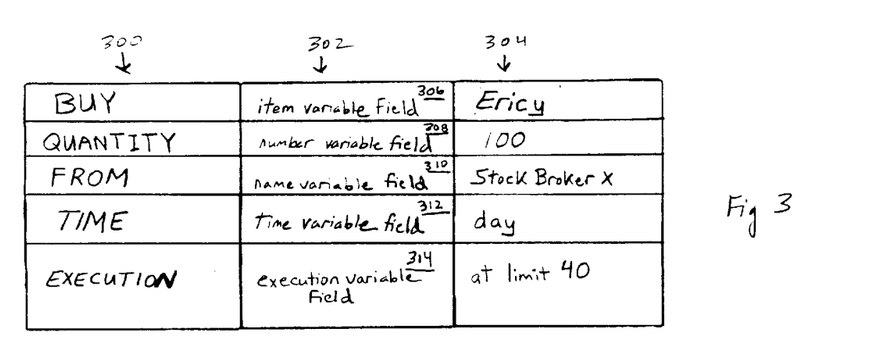
FIG. 3 is a tabular representation of a voice transaction message in accordance with an embodiment of the present invention.

FIG. 3 is a tabular representation of a stock purchase predetermined format where the column 300 represents the static components, the column 302 represents the variable fields, and the column 304 represents examples of values for the corresponding variable fields.

The voice transaction message is generated by the user dialing a dedicated telephone number for the transaction server 101, where when the mobile service provider 102 receives the cellular telephone call from the cellular telephone 104 it connects the cellular telephone with the transaction server 101. Thus, a communications link between the transaction server 1 01 and the cellular telephone 104 is created using the communications interface 110, the mobile service provider antenna 112, and the cell phone antenna 130. Upon establishment of the link, the transaction controller 108 may be programmed to cause the user of the cellular telephone 104 to be prompted to enter the voice transaction message via the cell phone speaker 140. The user enters the voice transaction message by speaking the message in a predetermined format for the voice transaction message into the cellular microphone 138.

The static components 300 are spoken by the user, where each static component is followed by a variable field value 302, also spoken by the user and representing the desired transaction. Thus, for the stock purchase predetermined format of FIG. 3, the user speaks the word "BUY" followed by an item variable field value 306, and speaks the word "QUANTITY" followed by a number variable field value 308, speaks the word "FROM" followed by a name variable field 310, speaks "TIME" followed by a time variable field value 312, and speaks "EXECUTION" followed by an execution variable field value 314. The item variable field value 306 identifies a stock by the stock name or the stock ticker symbol. The number variable field value 308 identifies the number of stock shares to be purchased. The name variable field value 310 identifies the stock broker through whom the stock will be purchased. The time variable field value 312 identifies the time limit through which the transaction must occur before being canceled, and the execution variable field value 314 identifies a maximum price the user is willing to pay for the stock. The execution variable field value 314 specifies, for example, "AT LIMIT x" where x is the maximum price the user is willing to pay for a designated stock, "AT MARKET" where the user is willing to purchase the specified stock no matter what the price, etc. The time variable field 312 specifies, for example, "DAY" where if the stock is offered at the limitation placed by the execution variable field value within that calendar day, the stock purchase will occur, "GOOD TILL CANCELED" where if the execution variable field value is met for the specified stock at any time before the stock purchase transaction is canceled by the user, the transaction will occur, etc.

For example, where a user desires to purchase 100 shares of Ericsson stock from stockbroker X during that calendar day, but is not willing to pay more than $40.00 per share, the user would speak into the cell phone microphone 138, after being prompted by the transaction server 101, "BUY ERICY QUANTITY 100 FROM STOCKBROKER X TIME DAY EXECUTION AT LIMIT 40", where the underlined words represent examples from column 304 corresponding to the item variable field 306, the number variable field 308, the name variable field 310, the time variable field 312, and the execution variable field 314.

Figure 4:
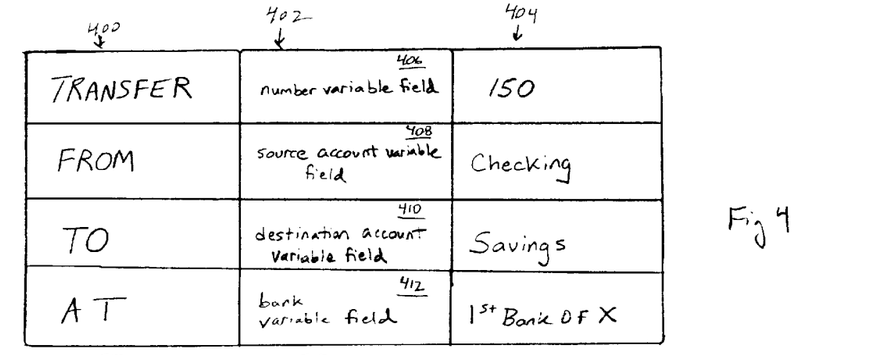
FIG. 4 is a tabular representation of a voice transaction message in accordance with an embodiment of the present invention.

FIG. 4 is a tabular representation of a bank transfer predetermined form, where static components are shown in column 400, variable fields are shown in column 402, and example values for variable fields are shown in column 404. A number variable field 406 represents an amount of money to be transferred. A source account variable field 408 represents an account from which the money is to be transferred. A destination account variable field 410 represents an account to which an amount of money is to be transferred. A bank variable field 412 represents the bank at which the transfer is to occur. Thus, where a user desires to transfer $150.00 from a checking account to a savings account at the First Bank of X, the user speaks into the cell phone microphone 138 after being prompted by the transaction controller 108, "TRANSFER 150 FROM CHECKING TO SAVINGS AT FIRST BANK OF X", where the underlined words represent examples from the column 404 corresponding to the number variable field 406, the source account variable field 408, the destination account variable field 410, and the bank variable field 412.

Figure 5:
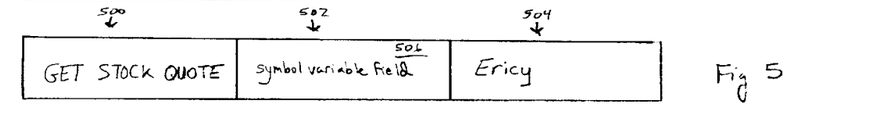
FIG. 5 is a tabular representation of a voice transaction message in accordance with an embodiment of the present invention.

FIG. 5 is a tabular representation of a stock quote predetermined format, where column 500 represents static components, column 502 represents variable fields, and column 504 represents an example value for the variable fields. A symbol variable field 506 represents a stock symbol for which a stock quote is desired. Thus, where a user desires to get a stock quote for Ericsson stock, the user speaks into the cell phone microphone 138, after being prompted by the transaction controller 108, "GET STOCK QUOTE ERICY", where the underlined word represents the example from the column 504 corresponding to the symbol variable field 506.

Figure 6:
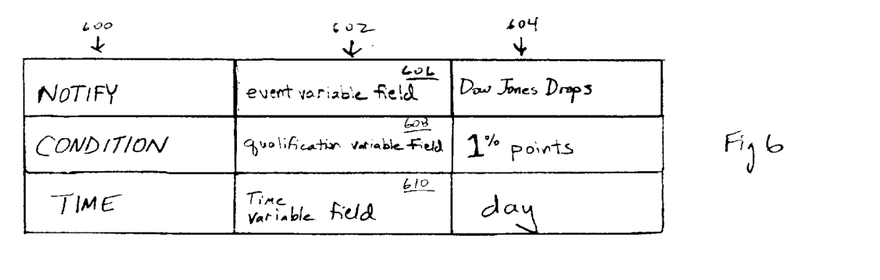
FIG. 6 is a tabular representation of a voice transaction message in accordance with an embodiment of the present invention.

FIG. 6 is a tabular representation of a stock event predetermined format where column 600 represents static components, column 602 represents variable fields, and column 604 represents example values for the variable fields of column 602. An event variable field 606 represents a stock index and a qualification, for example "DROPS" or "ADVANCES". A qualification variable field 608 represents a percentage qualifying the event variable field 606. A time variable field 610 represents a time limit during which the event and qualification must coincide. For example, where the time variable field 610 is "DAY", the event and qualification must occur during that calendar day for the user to be notified. Where the time variable field 610 indicates "GOOD TILL CANCELED", the user will be notified where the event and qualification occur at any time before the transaction is canceled. Thus, where a user desires to know if the Dow Jones drops one percent within that calendar day, the user speaks into the cell phone microphone 138, after being prompted by the transaction controller 108, "NOTIFY DOW JONES DROPS CONDITION 1% POINTS TIME DAY", where the underlined words represent examples from the Column 604 corresponding to the event variable field 606, the qualification variable field 608, and the time variable field 610.

Returning now to FIG. 2, the user speaks the voice transaction message into the cell phone microphone 138, after being prompted by the transaction controller 108. The voice transaction message is received at the transaction server 101, step 205, as a voice mail message. The transaction controller 108 stores the voice mail message in the transaction memory 114. The user ends the voice transaction message by, for example, pressing the "#" key, terminating the call with the transaction server 101, or by remaining silent for a predetermined amount of time such as five (5) seconds.

Once the voice transaction message is completely received at the transaction server 101, the voice transaction message is processed as shown in step 210. To process the voice transaction message, the transaction controller 108 causes the voice mail message to be sent from the transaction memory 114 to the voice recognition processor 116. The voice recognition processor 116 converts the voice transaction message into a recognized message, or sentence. This is accomplished using semantic analysis and knowledge of the predetermined formats, stored in the transaction memory 114, where the static components of the voice transaction message are determined from the recognized message. Once the static components have been identified, the transaction controller 108 is programmed to select the predetermined format utilized by the user from a data base of predetermined formats stored at the transaction memory 114. The transaction controller 108 is able to select a predetermined format, as each predetermined format contains a distinct or unique set of static components. Once the predetermined format is selected, the transaction controller 108 is sufficiently programmed to process the recognized message using the selected predetermined format to determine values for the variable fields. This is possible as each respective variable field is located between two (2) static components which remain constant in every message in the predetermined format, or a static component and the end of the voice transaction message.

Once the predetermined format and the values of the variable fields have been determined, a processed transaction message is generated, shown in step 215. The processed transaction message typically comprises an identification of the predetermined format, values of the variable fields for that predetermined format, and a transaction identification number. Typically, the processed transaction message is generated in SMS format by the SMS 128 based on information provided to the SMS 128 from the transaction controller 108.

Once the processed transaction message is generated, it is sent to the cellular telephone 104 as an identification of the predetermined format, values for the at least one variable field and a transaction identification number, step 220. This is typically accomplished using the SMS 128 via the communications interface 110, and the mobile service provider antenna 112. Alternatively, other services may be used to send the processed transaction message to the cellular telephone 104. For example, if the cellular phone and the server both support the Wireless Application Protocol (WAP) or a similar browser, the server may send back the transaction message as WAP content. As an additional alternative, the processed transaction message may include each static component with the corresponding variable field value and the transaction identification number.

The processed transaction message is received by the cell phone antenna 130, and communicated to the cell phone controller 132. Where the processed transaction message is in the form of a predetermined format identification followed by variable field values, the cell phone controller 132 is sufficiently programmed to access a database of predetermined formats stored at the cell phone memory 134 to retrieve static components for the identified predetermined format, where each static component for the predetermined format is displayed on the display 136 with the corresponding received variable field value. The transaction identification number is also displayed on the display 136. Alternatively, where the processed transaction message has been sent identifying all static components and corresponding variable field values and the transaction identification number, the cell phone controller 132 is programmed to display the static components and corresponding variable field values, and the transaction identification number on the cellular telephone display 136. Alternatively, the processed transaction message is sent to the cellular telephone 104 as a synthesized voice message for example, where a display device is not available. The synthesized voice message is generated by the transaction controller 108 of the transaction server 101, and communicated to the user of the cellular telephone via the cellular telephone speaker 140.

Once the processed transaction message has been received at the cellular telephone 104 and displayed on the cellular telephone display 136, the user is provided with the option of verifying the process transaction message, step 225. In one embodiment, such verification is accomplished where the cellular telephone controller 132 is programmed to prompt the user to verify the transaction message when the processed transaction message is received at the cellular telephone 104. For example, the user is prompted via further words displayed on the display 136 to depress the "1" key on the cellular telephone 104 indicating that the processed transaction message is correct and should be carried out, or to press the "2" key on the cellular telephone 104 indicating that the processed transaction message is not correct and should not be carried out by the transaction server 100. The cellular telephone controller 132 may be sufficiently programmed to generate a verification message, step 230, in an SMS format based on whether the "1" key or the "2" key of the cellular telephone was depressed. The verification message is then sent to the transaction server 101, step 235.

Alternatively, the processed transaction message may be verified by the user of the cellular telephone 104 dialing a second dedicated telephone number to the transaction server 101, used for verifying processed transaction messages. In this embodiment, upon establishing communication with the transaction server 101 via the second dedicated telephone number, the transaction controller 108 is sufficiently programmed to prompt the user, via synthetic voice, to depress the "1" key on the cellular telephone 104 to indicate that the processed transaction message is correct, and to depress the "2" key on the cellular telephone 104 to indicate that the processed transaction message is not correct. The user, by depressing the "1" key or the "2" key on the cellular telephone 104 thereby generates the verification message in DTMF format, step 230, which is immediately sent to the transaction server 101, step 230, via the communications link formed using the second dedicated telephone number. In this case, the user may be further prompted by the transaction controller 108 to enter the transaction identification number, identifying the transaction being verified by the user.

The verification message is processed by the transaction controller 108, step 240, to determine whether the processed transaction message was correct, step 245. Where the verification message indicates that the transaction is not correct, the user is prompted by the transaction controller 108 to reenter the voice transaction message, step 250, and the method returns to step 205. Alternatively, not shown, the user may be given the option to terminate the call.

Where the verification message indicates that the transaction is correct, the transaction is carried out as shown in step 255. This is accomplished where the transaction controller 108 sends the processed transaction message to the Internet 120 via the transaction interface 118 and either the PSTN 122 or the dedicated data link 124. The Internet 120 then delivers the processed transaction message to the transaction provider 106 via the second data link 126. The transaction provider 106 then carries out the transaction. The transaction provider 106 has a priori knowledge of the format of the processed transaction message, and is equipped to convert the information of the processed transaction message to a format usable for carrying out the transaction at the transaction provider 106, as would be known by one skilled in the art, The transfer provider 106, upon carrying out the transaction, indicates to the transaction controller 108 of the transaction server 101 that the transaction has been completed. The transaction controller 108 then generates a transaction complete message, step 260, which is sent to the cellular telephone 104, step 270, via the transaction server 101, the mobile service provider antenna 112, and the cell phone antenna 130, indicating to the user of the cellular telephone 104 that the transaction has been carried out.

The predetermined formats may be known to the user, or may be provided to the user in the form of a printed card, where the static component and corresponding variable fields are provided on the card. Alternatively, the user may access the predetermined message formats using the cellular telephone 104. The user may depress a function key, for example, a key 140 shown on the cellular telephone 104, which displays a list of predetermined message formats. The user scrolls through the list, and selects the desired predetermined message format. Upon selection, the predetermined message format is displayed on the display 136 in the form of static components with corresponding variable fields.

Having the telecommunications system 100 with the transaction server 101 provides the user of a communications device with a voice interface for performing transactions where a nearly unlimited vocabulary of words is recognized. This is possible as the transaction server 101 is performing the voice recognition on the predetermined message format provided by the user. Thus, the voice interface provided to the user is not limited by the processing power and memory constraints of the communications device. Additionally, once the transaction server 101 has processed the voice transaction message into a processed transaction message, the transaction server 101 provides the user with an opportunity to verify the processed transaction message. Thus, the chance of the transaction being interpreted incorrectly by the transaction server is minimized.

Although the present invention has been discussed with respect to a cellular telephone, one skilled in the art would realize that the advantages gained therefrom would be realized using any communications device, wireless or not. For example, a walkie-talkie may be used to generate the voice transaction message. Additionally, a standard telephone terminal connected to the server via the public switched telephone network may be used. In this case, the present invention provides a user of the standard telephone terminal to perform voice transactions with nearly unlimited vocabulary, while minimizing the cost for the standard telephone terminal as the voice recognition processor which processes the predetermined message formats is located at the server.

Further, although the connection between the transaction server and the transaction provider has been described using the Internet, one skilled in the art would realize that any network or communications link between the transaction server and the transaction provider would be sufficient for gaining the advantages of the present invention.

Although only the stocks purchased predetermined message format, the bank transfer predetermined message format, the stock quote predetermined message format and the stock event predetermined message format have been described in connection with FIGS. 3–6, one skilled in the art would realize that the present invention is not limited thereto, as other predetermined message formats may be used for carrying out other voice transactions.

Still other aspects, objects, and advantages of the present invention can be obtained from a study of the specification, the drawings, and the appended claims. It should be understood, however, that the present invention could be used in alternate forms where less than all of the objects and advantages of the present invention and preferred embodiments as described above would be obtained.

We claim:

1. A method for performing voice-enabled transactions using a remote communications device, comprising:

receiving a voice transaction message at a server from said communications device, said voice transaction message being in one of a plurality of predetermined formats for carrying out a transaction;

processing said voice transaction message and generating a corresponding processed transaction message for said transaction at said server;

sending said processed transaction message to said communications device;

verifying correctness of said processed transaction message at said communications device and sending a verification message indicating one of processed transaction message correct and processed transaction message not correct to said server; and processing said verification message at said server and carrying-out said transaction where said verification message indicates that said transaction is correct.

2. The method of claim 1 further comprising sending a transaction complete message from said server to said communications device after said transaction is carried out.

3. The method of claim 1 wherein receiving said voice transaction message at said server from said communications device comprises:

establishing a connection with said server using said communications device; and utilizing said connection to generate said voice transaction message at said server.

4. The method of claim 3 wherein utilizing said connection to generate said voice transaction message at said server comprises generating said voice transaction message as a voice mail message at said server.

5. The method of claim 1 wherein the plurality of predetermined formats each include at least one static component and at least one variable field for describing the transaction, and processing said voice transaction message and generating said corresponding processed transaction message for said transaction at said server comprise:

performing voice recognition on said voice transaction message to generate a recognized message;

processing said recognized message to identify a first static component;

selecting said predetermined format which includes said identified first static component;

processing said recognized message using said selected predetermined format to determine a value of said at least one variable field; and generating said corresponding processed transaction message using said selected predetermined format and said determined value of said at least one variable field.

6. The method of claim 5 wherein said predetermined format further comprises a second static component, and:

said processing said recognized message to identify said first static component further comprises identifying said second static component;

said selecting said predetermined format further comprises selecting said predetermined format which includes said first and second static components; and said processing said recognized message using said selected predetermined format to determine the value of said at least one variable field comprises determining a first location of said first static component of said recognized message, determining a second location of said second static component of said recognized message, and selecting information between said first and said second location of said recognized message as said value of said at least one variable field.

7. The method of claim 5 wherein each of said plurality of predetermined formats include at least one static component and at least one variable field, and said processing said voice transaction message comprises selecting one of said predetermined formats using said at least one static component and determines a value for said at least one variable field of said selected predetermined format, and sending said processed transaction message to said communications device comprises communicating said selected predetermined format and said determined value of said at least one variable field to said communications device.

8. The method of claim 7 wherein verifying correctness of said processed transaction message at said communications device comprises displaying at said communications device said determined value of said at least one variable field and said at least one static field included with said selected predetermined format.

9. The method of claim 1 wherein verifying correctness of said processed transaction message at said communications device comprises voice verification of said processed transaction message at said communications device.

10. The method of claim 1 wherein said communications device is a cellular telephone and sending said processed transaction message to said communications device comprises:

converting said processed transaction message to a short message service format, and utilizing a server short message service to send said converted processed transaction message to said cellular telephone.

11. The method of claim 1 wherein carrying-out said transaction where said verification message indicates that said transaction is correct comprises:

transmitting information corresponding to said transaction from said server to a transaction service; and performing said transaction at said transaction service.

12. The method of claim 11 wherein transmitting information corresponding to said transaction from said server to said transaction service is done on the Internet.

13. The method of claim 1 wherein said transaction is an e-commerce transaction.

14. The method of claim 1 wherein said communications device is a wireless communications device.

15. The method of claim 14 wherein said wireless communications device is a cellular telephone.

16. A server for processing voice-enabled transactions from a remote communications device comprising:

a communications interface in communication with said communication device for receiving a voice transaction message generated at said communications device, said voice transaction message being in one of a plurality of predetermined formats for carrying out a transaction, a voice recognition processor coupled to the communications interface for performing voice recognition on said voice transaction message to generate a recognized message; and a controller operating under a program and in communication with said communications interface and said voice recognition processor to process said received recognized message, generate a corresponding processed transaction message for said transaction, send said processed transaction message to said communications device using said communications interface, receive a verification message from said communications device via said communications interface indicating one of processed transaction message correct and processed transaction message not correct, and carry out said transaction where said verification message indicates that said processed transaction message is correct.

17. The server of claim 16 wherein the controller generates a transaction complete message indicating completion of the transaction after carrying-out said transaction where said verification message indicates that said processed transaction message is correct, and sends said transaction complete message to said communications device via said communications interface.

18. The server of claim 16 further comprising a memory coupled to said communications interface, said voice recognition processor and said controller for storing said voice transaction message, said recognized message, and said plurality of predetermined formats.

19. The server of claim 18 wherein said plurality of predetermined formats include at least one static component and at least one variable field for describing said transaction, and said controller processes said recognized message by retrieving said recognized message from said memory, identifying a first static component of said recognized message, selecting said predetermined format which includes said first static component, processing said recognized message using said selected predetermined format to determine a value of said at least one variable field, and said controller generates said corresponding processed transaction message using said selected predetermined format and said determined value of said at least one variable field.

20. The server of claim 16 wherein each of said plurality of predetermined formats include at least one static component and at least one variable field, and said controller processes said voice transaction message using said at least one static component to select one of said predetermined formats and determine a value for said at least one variable field of said selected predetermined format, and sends said processed transaction message by communicating said selected predetermined format and said determined value of said at least one variable field.

21. The server of claim 16 wherein said communications device is a cellular telephone, and further comprising a short message server processor in communication with said controller and said communications interface, wherein said controller converts said processed transaction message to a short message service format and sends said processed transaction message to said cellular telephone using said short message service processor and said communications interface.

22. The server of claim 16 further comprising a transaction interface in communication with said controller, wherein said controller establishes a connection with a transaction service using said transaction interface, and carries out said transaction by transmitting information corresponding to said transaction to said transaction service.

23. The server of claim 22 wherein said transaction interface is a connection with the Internet, and said transaction service is an Internet web site.

24. The server of claim 16 wherein said transaction is an e-commerce transaction.

25. The server of claim 16 wherein said voice transaction message includes at least one static component and at least one variable field.

* * * * *